UNITED STATES PATENT OFFICE.

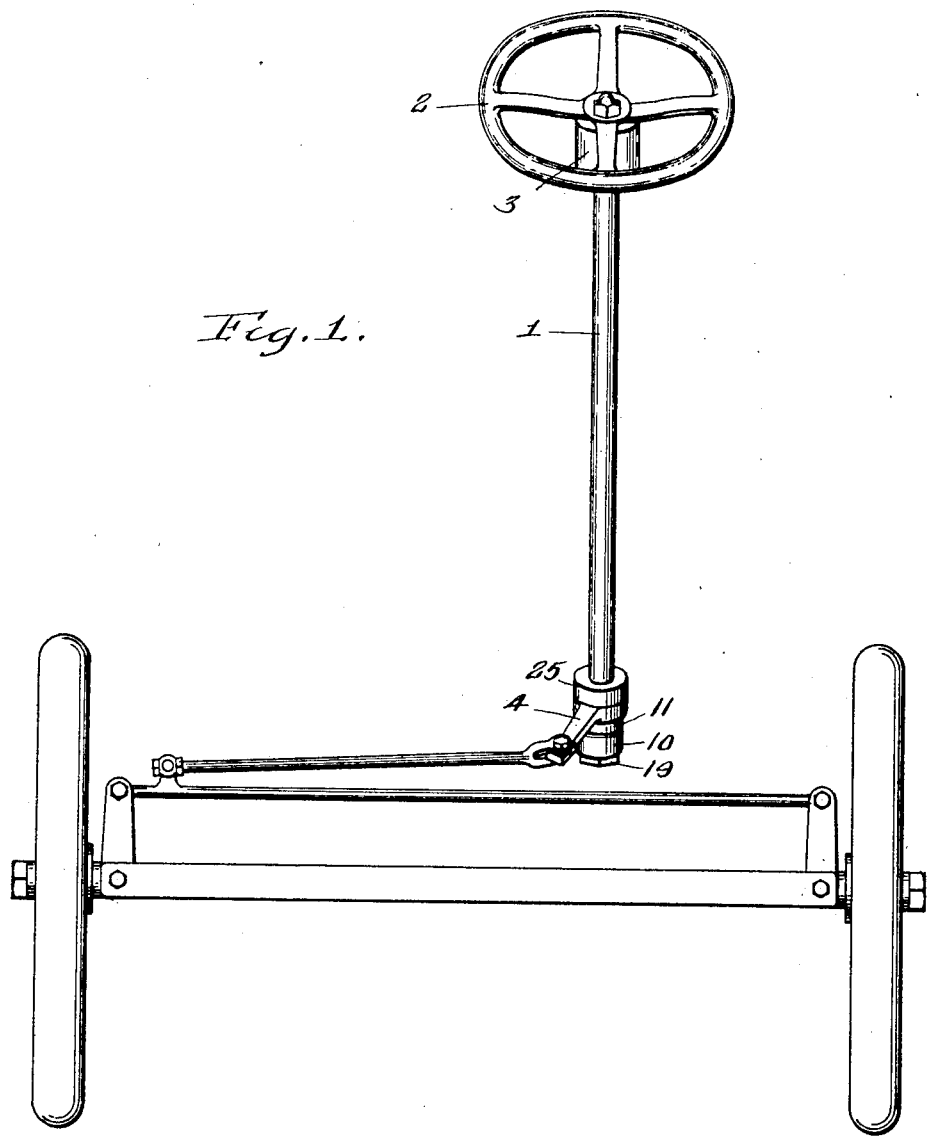

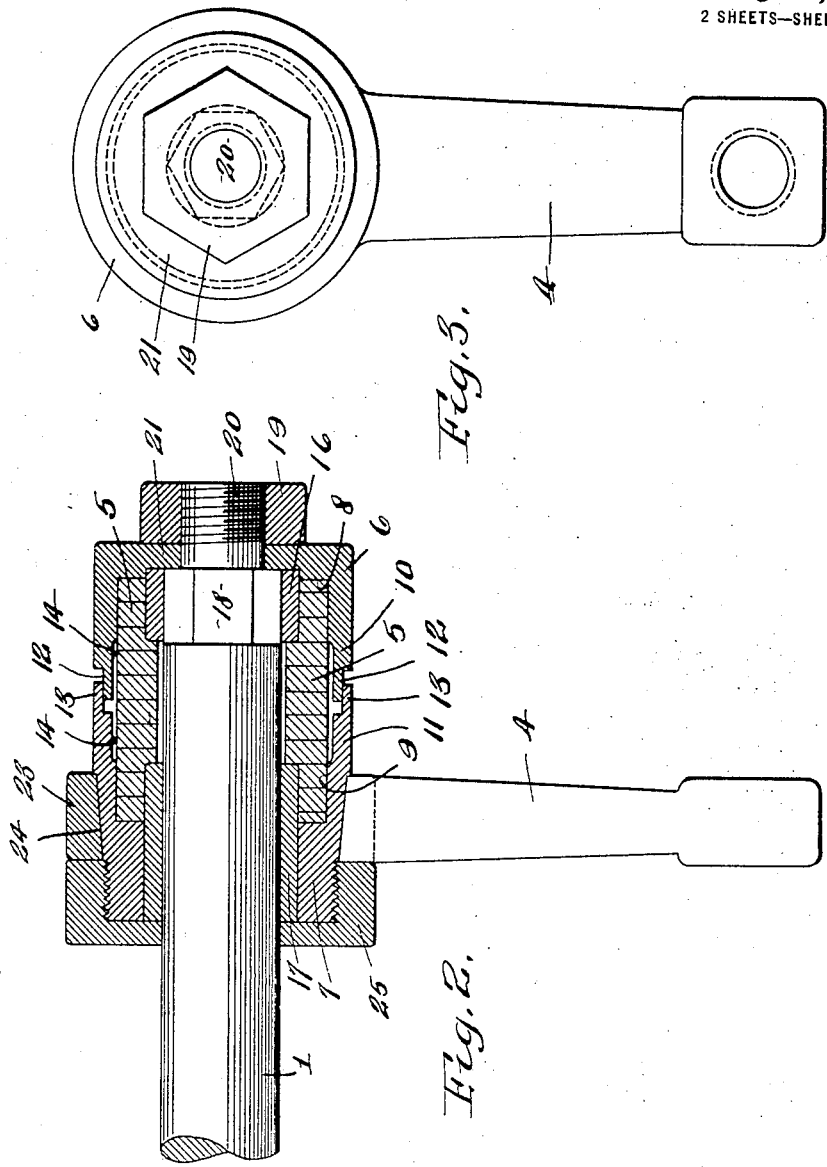

MAXWELL R. KARGE, OF PHOENIX, NEW YORK, ASSIGNOR TO THE CITIZENS NATIONAL BANK, OF FULTON, NEW YORK.

STEERING-GEAR FOR MOTOR-VEHICLES.

1,387,727.  Specification of Letters Patent.  Patented Aug. 16, 1921.

Application filed July 9, 1920. Serial No. 395,002.

*To all whom it may concern:*

Be it known that I, MAXWELL R. KARGE, a citizen of the United States, and a resident of Phoenix, in the county of Oswego and State of New York, have invented a certain new and useful Steering-Gear for Motor-Vehicles, of which the following is a specification.

This invention relates to steering gears for motor vehicles, and has for its object a particularly simple and efficient arrangement of a yielding power transmitting element between the steering wheel and the road wheels. It consists in the novel features and in the combinations and constructions hereinafter set forth and claimed.

In describing this invention, reference is had to the accompanying drawings in which like characters designate corresponding parts in all the views.

Figure 1 is a plan view of a steering gear embodying my invention.

Fig. 2 is a fragmentary detail view showing the steering column and the motion transmitting means thereon, said means being shown in section.

Fig. 3 is an end elevation of parts seen in Fig. 2.

This steering gear comprises generally, a steering column, an element for transmitting the movement of the column to the ground wheels of the vehicle, and a torsion spring coiled about the column and connected at one end thereto and at its other end to said element.

1 designates the steering column on which is mounted the usual steering or tiller wheel 2. Suitable reducing gearing 3 may be interposed between the wheel 2 and the column 1 or between the column and the ground wheels as will be understood by those skilled in the art.

4 is the element for transmitting the motion of the column to the steering knuckles, or to a cross rod connecting them as will be understood by those skilled in the art.

5 is the torsion spring which is here illustrated as connected at its ends respectively to heads 6, 7 mounted on the column, one as 6 being fixed to the column to rotate as a unit therewith, and the other as 7 being loosely mounted on the column to move about the column as the spring is tensioned or recoiling, the motion transmitting element 4 being mounted on the head 7.

As here illustrated, the heads 6, 7 are formed with annular recesses 8, 9 in their opposing ends in which the end coils of the spring are held, and with sleeve extensions 10, 11 on their opposing sides which inclose the intermediate coils of the spring, these extensions having lapping flanges 12, 13 at their ends. The sleeves 10, 11 are also formed with clearances 14 on their inner faces to permit limited expansion of the intermediate coils of the spring and limit the expansion in order to prevent undue strain on the spring after it has expanded or been tensioned a predetermined amount in one direction. The intermediate coils of the spring are also normally spaced apart slightly from the column 2 and contract and bind on the same when the spring is contracted or tensioned a predetermined amount in the opposite direction. Said spring is also formed rectangular in cross section, so that opposing faces of its coils are flat and bind friction plate fashion on each other when the spring is contracting. These specific springs form the subject matter of my pending application, Sr. No. 364,712, filed March 10, 1920.

The annular recesses 8, 9 are shown as provided by inserting sleeves or plugs 16, 17 in the bores thereof and having their inner ends opposed to the bases of the sleeve extensions. The heads are shrunk, welded or otherwise secured to the end coils of the spring, and the plugs 16, 17 are driven into the bores of the heads and the end coils of the spring to snugly fit therein.

The head 6 or the plug 16 thereof is here illustrated, as fixed to the column by fitting it on a non-circular or square portion 18 near the lower end of the column, and said head 6, head 7, spring 5 and element 4 are held in assembled relation to the column by a nut 19 threading on a reduced portion or stud 20 at the extreme end of the column against an internal annular flange 21 on the head 6 which flange is provided with a bore through which the stud extends, and which abuts against the end of the square portion 18 of the column.

The motion transmitting element 4 in this form of my invention comprises an arm having a bearing or ring 23 encircling the head 7 on a tapered portion 24 thereof and is held thereon by a nut or cap 25 threading on the head 7 against said ring 23.

In operation, during turning of the column in one direction or the other the motion thereof is yieldingly transmitted through the spring 5 until the contraction of the spring is limited by reason of the coils binding on each other or on the column when the spring is tensioned in one direction or until the expansion thereof is limited when tensioned in the opposite direction.

The spring also tends to hold the ground wheels straight and to absorb shocks due to the wheels striking obstructions or inequalities in the road.

What I claim is:

1. A steering gear comprising a steering column, an element for transmitting the movement of the steering column, and a torsion spring coiled about the steering column and connected at one end thereto and at its other end to said element, substantially as and for the purpose described.

2. A steering gear comprising a steering column, opposing heads mounted on the column, one being mounted to rotate therewith and the other to rotate thereon, a torsion spring coiled about the column and fixed at its ends to the heads, and a motion transmitting element mounted on and movable with the head which is rotatably mounted on the column, substantially as and for the purpose specified.

3. A steering gear comprising a steering column, opposing heads mounted on the column, one being mounted to rotate therewith and the other to rotate thereon, a torsion spring coiled about the column and fixed at its ends to the heads, and a motion transmitting element mounted on and movable with the head which is rotatably mounted on the column, the heads having sleeve extensions inclosing the intermediate coils of the spring and provided with clearances on their inner faces for permitting limited expansion of the intermediate coils of the spring, substantially as and for the purpose set forth.

4. A steering gear comprising a steering column, opposing heads mounted on the column, one being mounted to rotate therewith and the other to rotate thereon, a torsion spring coiled about the column and fixed at its ends to the heads, and a motion transmitting element mounted on and movable with the head which is rotatably mounted on the column, the heads having sleeve extensions inclosing the intermediate coils of the spring and having their end portions lapping each other, substantially as and for the purpose described.

5. A steering gear comprising a steering column, a head mounted on the column to rotate therewith and being held from endwise movement thereon, a second head mounted on the column to move about the same, one of said heads having a slight endwise movement, a coiled torsion spring encircling the column between the heads and secured at its ends to the heads, and a motion transmitting part mounted on the second head to turn therewith, substantially as and for the purpose specified.

6. A steering gear comprising a column, having a reduced threaded portion, or stud at one end, a head mounted on the end of the column and having an opening for the stud, the head being secured to the column to rotate therewith, a second head mounted on the column to move about the same, a coiled torsion spring encircling the column and secured at its ends to the heads, a motion transmitting element mounted on the second head, a nut threading on the stud against the first head, and a nut threading on the second head against said element, substantially as and for the purpose set forth.

7. A steering gear comprising a column, having a reduced threaded portion, or stud at one end, a head mounted on the end of the column and having an opening for the stud, the head being secured to the column to rotate therewith, a second head mounted on the column to move about the same, a coiled torsion spring encircling the column and secured at its ends to the heads, a motion transmitting element mounted on the second head, a nut threading on the stud against the first head, and a nut threading on the second head against said element, the heads having sleeve extensions inclosing the spring, substantially as and for the purpose described.

In testimony whereof, I have hereunto signed my name, at Phoenix, in the county of Oswego, and State of New York, this 26th day of June, 1920.

MAXWELL R. KARGE.